Patented June 22, 1948

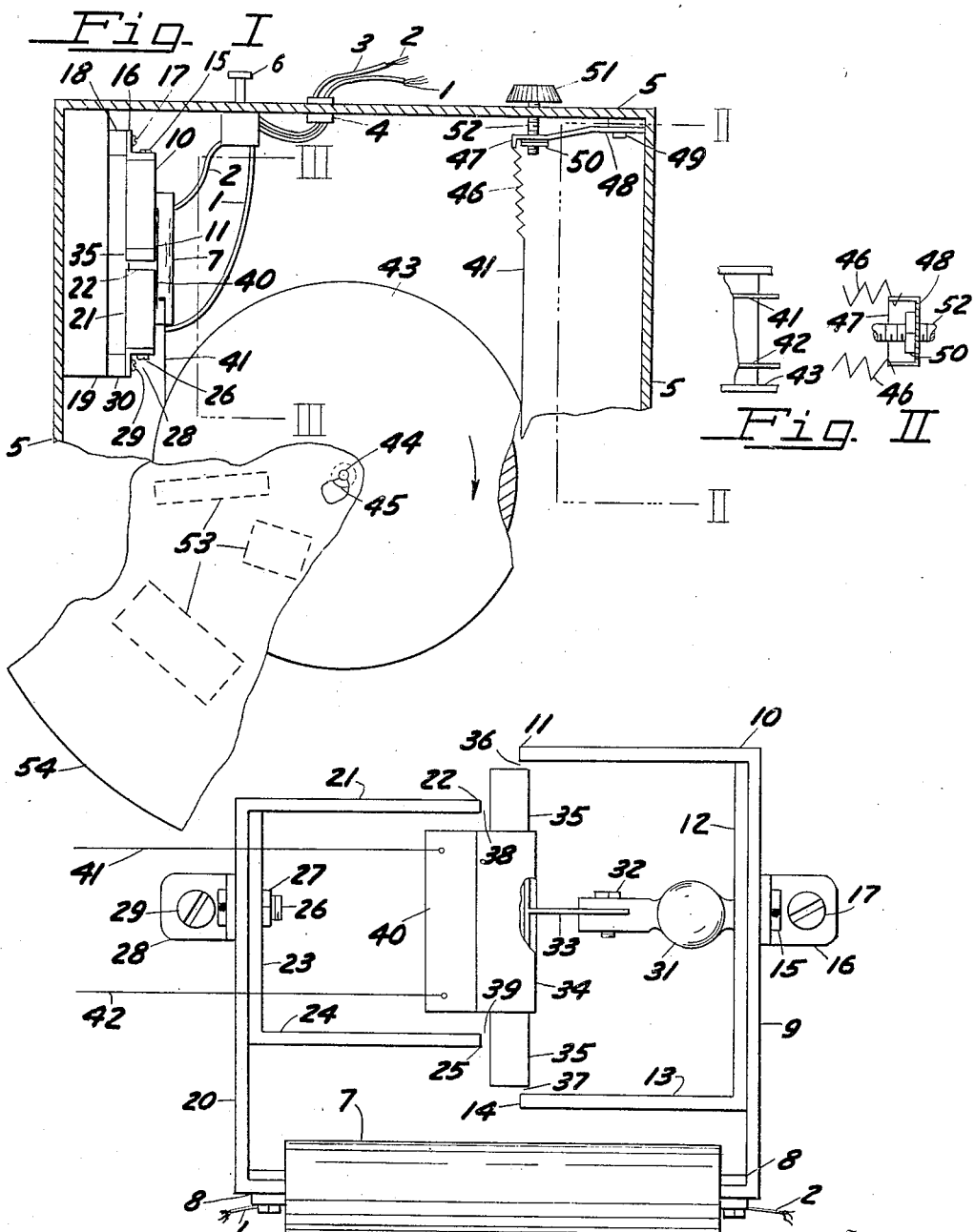

2,443,803

UNITED STATES PATENT OFFICE 2,443,803

POWER UNIT

Dewey E. Rockenfelder, Bryan, Ohio

Application May 17, 1946, Serial No. 670,501

2 Claims. (Cl. 172—126)

This invention relates to conversion of electricity into motion, especially as to an adjustable driven speed.

This invention has utility when incorporated in a yieldably mounted oscillable permanent magnet located as an armature between pairs of electromagnet alternating current energized poles in opposing relation. Transmission means is connected to respond to the permanent magnet armature rocking, being in the form of alternatively pulled flexible means or cords, serving as an intermittent grip device in a wrap about a drum. The remote ends are yieldably held, with an adjustment therefor, which, as the spring tension be increased, pulls down the rate of speed developed by the intermittent grip device.

Referring to the drawings:

Fig. I is a plan view of an embodiment of the invention in a turn-table operating installation, parts being broken away;

Fig. II is a fragmentary detail view on the line II—II, Fig. I, showing the cable tauting springs and the tension adjusting means therefor; and Fig. III is an enlarged view, with parts broken away, from the line III—III, Fig. I, showing the oscillable permanent magnet as an armature located in the flux region of opposing pairs of alternating electric current energized electromagnetic poles.

Sixty cycle one hundred ten volt alternating electric current supply thru stranded lines 1, 2, into flexible conductor 3, may, thru an insulation spool 4, enter a housing or box 5 to a push and pull type of switch 6. From the switch 6, line 1 extends to one end of an alternating electric current coil, say 1000 ohms resistance. The circuit thru this coil 7 is completed back to the switch 6 by the line 2.

Magnetic flux energized strips 8 form the core of the alternating electric current electromagnet having the coil 7. A magnet section 9, integral with the core 8, extends upward therefrom and there has a right angle extension terminating in a pole end 11. Nested in the section 9 from the arm 10 is a section 12 having an arm 13 parallel to the arm 10 and spaced therefrom in providing a pole end 14.

A screw 15 assembles the magnetic pole sections 9, 12, and carries therefrom, one-way exterior of the fork of the horseshoe form electromagnet, an angle bracket 16. The angle bracket 16 is of non-magnetic material. The other angle of the bracket 16 than that engaged by the screw 15 has a screw 17. This screw 17 from the bracket 16 is thru a rubber cushion insulator 18 and engages the housing 5.

From the opposite end of the coil 7, magnetic flux conductor section 20 rises to an arm 21 terminating in a pole end 22, out of the plane of and inward from the pole end 11. Nested in the section 20 is a section 23 having, parallel to the arm 21, an arm 24, having an end 25 offset inward from but extending toward the pole end 14. There is thus formed an opposing, somewhat narrower forked horseshoe electromagnet to that of the arms 10, 13. On a screw 26 is a nut 27 assembling the sections 20, 23, with each other and a copper angle bracket 28, which thru a screw 29 is spaced by a rubber insulator cushion 30 from the block 19, on which this power conversion device is mounted in the housing 5.

The screw 15 locates, between the fork arms of the horseshoe electromagnet 10, 13, a non-magnet or brass arm 31 having a screw clamp 32 to hold a spring tongue or strip 33, as of brass or steel. The free end of this strip 33 is anchored with a sleeve 34 about a permanent magnet 35, thereby located as an armature in the flux region or field between the opposing pairs of poles of the two electromagnets energized from a single alternating current coil 7 common to each thereof. The magnet 8, 9, 10, 12, 13, 20, 21, 23, 24 may be laminated, the better to respond to special operating conditions.

Clearing the upper end of the permanent magnet armature 35 from the pole end 11 is an air gap 36 in the range of $1/64$ inch, with a similar clearance for an air gap 37 between the armature 35 opposite end and the pole tip 14. These air gaps 36, 37, are beyond the ends of the armature 35. While the flexible tongue 33 allows the energized system to oscillate the armature 35, the operation is quiet. There is no hammering or contact, even should the tips of the armature 35 reduce the respective air gaps 36, 37, in the armature movement. However, it follows that this movement, while it may shorten the air gaps, does increase the opposing flux concentration areas.

Between the pole tip 22 and the armature 35 is an air gap 38, which, desirably, is greater than the air gaps 36, 37, say in the range of $1/16''$–$1/32''$ for an armature $1\frac{1}{2}''$ in length. The pole tip 25 has an air gap 39. This air gap 39 is similar to the air gap 38. The flux concentration areas at these air gaps 38, 39, inasmuch as they are located spaced from the ends of the armature 35, do not vary, but merely lengthen and shorten in response to the oscillation movements of the armature 35 as permitted by the tongue 33 upon the rapid flux direction reversals of the alternating current cycles.

The sleeve 34 is provided with a tongue or wing 40, from which upper and lower portions extend in parallel flexible means or cords 41, 42. The showing herein is for a wide angle wrap about a 4½" diameter drum 43 mounted in the housing 5 on a shaft 44, having a step bearing 45 thereby providing positive means for holding the armature 35. The cords 41, 42, at their remote ends engage tension springs 46 independently connected to a wing 47 as the free end of a strap 48 as a hinge having anchor 49 with the housing 5. The flexible hinge 48 at its free end carries an internally threaded means or nut 50 between the connections of the springs 46 thereto. A control head 51 exterior of the housing 5, has a threaded stem 52 coacting with the nut 50 for adjusting the tension on the cords 41, 42.

While the device may have a wide range of adaptations, the power unit herein has fixed with the shaft 44 a turntable 54, upon which may be placed merchandise articles 53 for display during the table rotation.

This magnetic device is quiet in operation. Notwithstanding the quite small airgaps, no audible knocking is developed. The flexible strip 33 is sufficiently rigid to restrict the permanent magnet 35 to but slight movement in the oscillation of one end to vary its relations one way with the air gaps 36, 38, and the other way as to its other end as to the airgaps 37, 39.

The tension springs 46, thru the screw adjustment 51, 52, 50, may pull the cords 41, 42, uniformly from the opposite ends of the armature 35, for such tautness that there be no drive whatsoever transmitted to the drum 43, and the table 54 as carried thereby. A slacking back of the springs 46 may be nicely refined to determine a desired rotation rate for the shaft 44. This is a direct gearless speed reduction of noiseless elements in their operation. As the slack holding be less taut, the rotation rate of the table 54 is increased. An adjusted rate for operation as established by the adjustment, holds to a constant in the range of a synchronous motor, so that the driven part or table 54 may be a time disclosing means, as for a clock. The turntable 54 has handled a 25 pound load thereon.

The gripping of the drum 43 for the drive seems to be in response to the differential between the two cords or cables 41, 42. As one cable 41 is taut, say by swinging of the armature 35 clockwise for its top to have greater flux area at the gap 36, the airgap area 37 at the opposite end is reduced, while the airgap distance 39 is reduced, and relatively the cable 42 is not quite so taut from its spring 46 in its wrap engagement with the drum 43, as is the cable 41 at tension action thereon. The springs 46, as approximately similarly acting upon each cable 41, 42, are not to develop slack, even to an extent for the upper cable 41 to sag down toward the cable 42 anywhere, or even at the drum 43.

What is claimed and it is desired to secure by Letters Patent is:

1. A permanent magnet, a mounting therefor limiting magnet movement to oscillation about an axis medially thereof as to the magnet length, a pair of U-shaped pole portions fixed in opposing relation and located for the permanent magnet to be an armature having magnetic flux proximity for coaction with the U-shaped pole portions, and an alternating electric current energizing coil common for the U-shaped pole portions with one U-shaped pole portion one way from the coil and the other U-shaped pole portion the other way from the coil.

2. An intermittent grip adjustable speed power unit comprising a permanent magnet armature, a narrow fork U-shaped pole portion directed toward the armature in magnetic flux proximity laterally from the armature near the armature opposite ends, a second wider fork U-shaped pole portion oppositely directed toward the armature beyond the ends of the armature also having magnetic flux proximity for coaction with the armature, a control mounting for the armature holding the armature to oscillation clear of airgap closing, an alternating current energizing coil having a core therethru between the U-shaped pole portions, cord means from opposite ends of the armature, a rotary drum engaged by the cord means, and tension adjusting means for the cord means adapted to vary the speed of the drum.

DEWEY E. ROCKENFELDER.

REFERENCES CITED

The following references are of record in the file of this patent:

UNITED STATES PATENTS

| Number | Name | Date |
|---|---|---|
| 1,315,975 | Lincoln | Sept. 16, 1919 |
| 1,489,848 | O'Leary | Apr. 8, 1924 |

FOREIGN PATENTS

| Number | Country | Date |
|---|---|---|
| 370,736 | Italy | Apr. 28, 1939 |